United States Patent [19]

McAlpin et al.

[11] Patent Number: 5,468,440
[45] Date of Patent: Nov. 21, 1995

[54] PROCESS OF MAKING ORIENTED FILM OR STRUCTURE

[75] Inventors: James J. McAlpin, Houston; Jeffrey W. C. Kuo, Seabrook; Donald C. Hylton, Houston, all of Tex.

[73] Assignee: Exxon Chemical Patents Inc., Wilmington, Del.

[21] Appl. No.: 239,150

[22] Filed: May 6, 1994

[51] Int. Cl.⁶ .......................... B29C 55/02; B29C 55/22
[52] U.S. Cl. .................. 264/291; 156/229; 156/244.11; 156/244.14; 264/209.3; 264/210.1; 264/210.8; 264/216; 264/288.4; 264/290.2; 264/290.5; 264/564; 427/172; 427/173
[58] Field of Search .................. 264/171, 209.3, 264/209.5, 210.1, 210.8, 216, 288.4, 290.2, 290.5, 291, 564; 156/229, 244.11, 244.14; 427/172, 173

[56] References Cited

U.S. PATENT DOCUMENTS

| | | | |
|---|---|---|---|
| 5,145,819 | 9/1992 | Winter et al. | 502/117 |
| 5,198,401 | 3/1993 | Turner et al. | 502/155 |
| 5,240,894 | 8/1993 | Burkhardt et al. | 502/108 |
| 5,241,031 | 8/1993 | Mehta | 264/210.1 X |
| 5,278,119 | 1/1994 | Turner et al. | 502/155 |
| 5,296,434 | 3/1994 | Karl et al. | 502/117 |
| 5,322,728 | 6/1994 | Davey et al. | 264/210.8 X |
| 5,393,599 | 2/1995 | Quantrille et al. | 156/229 X |

FOREIGN PATENT DOCUMENTS

| | | |
|---|---|---|
| 485820A2 | 5/1992 | European Pat. Off. . |
| 485821A1 | 5/1992 | European Pat. Off. . |
| 485822A2 | 5/1992 | European Pat. Off. . |
| 485823A1 | 5/1992 | European Pat. Off. . |
| 518092A2 | 12/1992 | European Pat. Off. . |
| 519237A2 | 12/1992 | European Pat. Off. . |

OTHER PUBLICATIONS

Walter Spaleck, A. Winter, B. Bachmann, V. Dolle, F. Kuber, and J. Rohrmann, "New Isotactic Polypropylenes by Metallocene Catalysts", MetCon '93, Houston, Tex., May 26–28, 1993, pp. 189–200.

*Primary Examiner*—Leo B. Tentoni
*Attorney, Agent, or Firm*—M. Susan Spiering

[57] ABSTRACT

Applications of isotactic polypropylene resin compositions produced from metallocene catalyst wherein the resins yield articles with comparable shear modulus and heat distortion temperature values to those of conventional polypropylene, but in which the fabrication of the article is achieved at temperatures much lower than possible for conventional polypropylene.

17 Claims, 1 Drawing Sheet

FIG. 1

PROCESS OF MAKING ORIENTED FILM OR STRUCTURE

FIELD OF THE INVENTION

The present invention relates to applications of metallocene polypropylene resin compositions. More particularly, this invention relates to a process for forming articles with stiffness and service temperatures equivalent to those formed by conventional processes using conventional polypropylene but which invention process is operable at lower temperatures.

BACKGROUND OF THE INVENTION

Isotactic polypropylene resins are useful for many applications. The relatively high end-use temperature, and high modulus of the material are two features which contribute strongly to its utility among polyolefins. Modulus refers to the shear modulus value of a given resin obtained through dynamic mechanical testing in accordance with ASTM D4065. For purposes of this invention, service temperature is defined as the end-use temperature of the article, film, sheet, or fiber produced from the polypropylene resin. The Heat Distortion Test (HDT), also referred to as Heat Deformation Test or Heat Deflection Test, is widely used to define the service temperature of thermoplastics. In this test, a weight is hung from a cantilevered molded bar held in a chamber and the temperature of the chamber is raised at a set rate until the bar droops a given amount. This test is conducted in accordance with ASTM D648 at either 66 psi (455 kPa) or 264 psi (1820 kPa) specific load. The HDT value is a measure of the resistance to deformation of a material under the influence of stress at an elevated temperature. HDT value is an indication of the highest temperature at which a plastic material retains acceptable integrity for commercial utility. HDT values referenced herein are relative to the 66 psi (455 kPa) specific load test.

In order to maximize the utility of polypropylene resins, it is desirable to design the resin to have as high a modulus and HDT value as possible. Typically, for conventional polypropylene resins maximizing the modulus and HDT value also maximizes the melting point of the resin. For melt processing, such as done for injection molded articles, fabrication of the polypropylene occurs at temperatures above the melting point. The properties of polypropylene can be enhanced by orientation at temperatures slightly below the crystalline melting point. Textile fibers, uniaxially, and biaxially-oriented films are examples of products which benefit from such an orientation process. For orientation processing, the temperature of the polypropylene is held at a temperature slightly below the melting point. Generally, in either processing, the high melting point of the resin requires the use of high temperatures for the processing equipment. This is undesirable because heating the resin to the elevated temperature prior to processing, and then cooling it down afterward takes additional time which affects production rates and economics. Additionally, this is undesirable because energy consumption of the process suffers.

According to Spalek, et.al., at a presentation made at the Metallocene Conference, Houston, Tex., May, 1993, the relationship between melting temperature and room temperature modulus are different for metallocene and conventional polypropylenes. Spalek, et.al., disclosed that metallocene homopolypropylene have higher room temperature modulus values than conventional polypropylene with comparable melt flow rate (MFR) and melting point (MP) values. In durable goods and high performance packaging applications, one is interested not only in room temperature modulus, but also in how this modulus responds to elevated temperatures.

It would be highly desirable to have a polypropylene resin having high modulus and HDT values, but which could be processed at a temperature below that required for a conventional polypropylene with comparable modulus and HDT values. Generally, this means having a resin with a high modulus and HDT value, but with a low melting point. For conventional isotactic homopolymers of propylene, the crystalline melting point is in the range of about 160°–165° C. and the HDT value is in the range of about 90°–105° C. For these conventional isotactic homopolymers, the orientation process generally occurs in a temperature range of about 135°–155° C. Thus, orientation temperatures for conventional polypropylene are about 40°–50° C., or more, above the HDT value. It would be highly desirable to process isotactic polypropylene resin at lower temperatures than currently known without compromising HDT value, modulus or other important properties of the resulting product.

SUMMARY OF THE INVENTION

We have found, surprisingly, that isotactic polypropylene resins produced from metallocene-based catalyst systems have surprisingly low melting points when compared to a conventional polypropylene having similar modulus and service temperature (as measured by HDT). The present invention relates to a process for forming oriented structures or articles, preferably oriented films, made from metallocene polypropylene at temperatures below conventional polypropylene resins.

In accordance with the present invention, there is provided a process for forming an oriented structure comprising the steps of:

(a) forming a structure from a polypropylene resin, said polypropylene resin produced from a metallocene catalyst;

(b) orienting the structure by applying stress at a temperature in the range from about 20° C. above the HDT of the polypropylene to about 2° C. less than the melting point of the polypropylene.

Alternatively, the oriented structure may be processed, or oriented, at a temperature in the range of about 20° C. to about 35° C. above the HDT of the polypropylene. Preferably, processing occurs at a temperature range of about 20° C. to about 30° C. above the HDT of the polypropylene.

A metallocene catalyst system is typically employed for the production of the polypropylene polymer. The metallocene may be activated by a cocatalyst such as alumoxane, or an ionic compound capable of reacting with the metallocene to form a catalyzed system.

The metallocene may be employed in a homogeneous form or alternatively, is supported on an inert carrier and optionally prepolymerized with olefinic monomer(s). In a preferred embodiment, the metallocene is supported on a silica carrier.

Polypropylene produced from metallocene catalysts is employed as either a homopolymer or copolymer. Copolymers of propylene and a comonomer having between 2 and about 20 carbon atoms, and polypropylene blend compositions are also suitable for the process of this invention.

The oriented structures of the present invention may be films, fibers, thermo- or pressure-formed, or stretch molded articles. Conventional means may be employed to orient or melt-form articles from resins described in the present invention.

DESCRIPTION OF THE PREFERRED EMBODIMENTS

Introduction

It has been discovered that metallocene catalysts produce isotactic polypropylene resin compositions having melting points lower than conventional polypropylene of similar modulus and heat deflection test values. Generally, these resins are propylene homopolymers or propylene statistical copolymers that employ propylene and one or more comonomer(s), preferably an alpha olefin having from 2 to about 20 carbon atoms, or a cyclic olefin. The metallocene produced polypropylene may also be a blend of polypropylene and another polymer with different properties.

The present invention relates to applications of these polypropylene compositions made from metallocene catalysts, and processes for orienting structures from these resins. Orienting structures are generally defined as films, sheets, fibers, or molded articles as described herein. The orienting or molding processes occur at temperatures lower than that currently available for conventional polypropylene resins. For purposes of this invention, conventional polypropylene is that polymer produced from Ziegler-Natta catalysts; metallocene polypropylene is that polymer produced from single-site, or cyclopentadienyl derivative transition metal catalysts. Polypropylene refers to isotactic polypropylene, homo- or copolymers or blends thereof. Copolymers refers to propylene based polymer prepared from propylene and one or more other monomers.

The principles embodied in the present invention are applicable to most processes where reduced temperature orientation, or forming, is a value. In melt processing operations, the temperature of the melted polymer just prior to forming the article is largely determined by two factors. First, the temperature must be sufficiently above the melting point of the polymer to guarantee the randomization of the molecules. Second, the temperature must be high enough so that the fluidity of the melt is sufficient to allow the melt to be injected into the mold or otherwise formed into the desired shape. With the surprisingly low melting points of the materials of the present invention, the first limitation on melt temperature can be relieved. This can lead to lower energy consumption and faster processing speeds for the equipment. Almost any thermoplastic fabrication process can benefit from these findings. Examples of processes other than those for oriented film and fibers where reduced temperature orientation may be of value include stretch-blow-molding, stretch-injection-molding, solid phase pressure forming or any thermoforming operation where the forming takes place at a temperature below the melting point of the material. Examples of melt forming processes which may also benefit from reduced temperatures include profile extrusion, sheet extrusion (optionally followed by thermoforming), film-extrusion, monofilament extrusion, nonwovens extrusion, and the like. As an example, currently, thermoforming operations of conventional homopolypropylene occur at a temperature of about 155°–160° C. With the metallocene of the present invention, thermoforming operations may occur at a temperature range of about 140°–145° C.

Examples of uses for the oriented film products made in accordance with the present invention include oriented film products for snack packaging or other food wrap, film products for heat sterilization or cook-in bag uses. Examples of uses of melt-blown articles formed in accordance with the present invention include steam-sterilizable rigid packaging, injection molded parts for major appliances and automotive interiors and exteriors.

Metallocenes Useful in Preferred Embodiments

In the most preferred embodiment, the polypropylene employed is produced from at least one metallocene comprising bridged, biscyclopentadienyl, Groups 4, 5, or 6 transition metal, dihalide or dialkyl derivatives. Even more preferred metallocenes include bridged bisindenyl, Group 4 dihalide derivatives. Specific metallocene catalysts known to be useful for producing isotactic polypropylene are discussed in EPA Nos. 485,820; 485,821; 485,822; 485,823; 518,092; and 519,237; U.S. Pat. Nos. 5,145,819; 5,296,434, all herein incorporated by reference for U.S. patent practice purposes.

The preferred metallocene employed in accordance with this invention are chiral and used as a racemate for the preparation of isotactic poly-1-olefins. Illustrative but non-limiting examples of metallocenes include: dimethysilylbis(2-methylindenyl) zirconium dichloride, dimethylsilylbis(2-ethyl-4-phenylindenyl) zirconium dichloride, dimethylsilylbis(2-methyl-4-phenylindenyl) zirconium dichloride, dimethylsilylbis(2-methyl-5-isobutylindenyl) zirconium dichloride, dimethylsilylbis(2-methyl-4,5-benzindenyl) zirconium dichloride, and, dimethylsilylbis(2-methyl-4,6-diisopropylindenyl) zirconium dichloride. The most preferred specific metallocene is dimethylsilylbis(2-methyl-4,5-benzindenyl) zirconium dichloride. Although silyl bridge and zirconium transition metal is specifically disclosed, one of skill in the art would appreciate that other types of bridging systems and transition metals may be employed.

The metallocene employed is preferably supported on an inert carrier and optionally prepolymerized. Numerous support techniques are known in the art. Most preferred is the technique employed in accordance with U.S. Pat. No. 5,240,894, herein incorporated by reference. Preferably, the supported metallocene is employed in a prepolymerized fashion. The prepolymer may be any alpha olefin, preferably ethylene, propylene, or butene, most preferably ethylene prepolymer.

The metallocene is preferably employed in the form of a complex of the metallocene with an activator. Activators may be alumoxane, as is well known in the art, or ionic activators such as disclosed in U.S. Pat. Nos. 5,198,401 or 5,278,119. It is believed that any compound which serves to activate the metallocene to a catalytic state is applicable to this invention.

Polypropylene of the Present Invention

The polypropylene employed in the present invention may be a homopolymer or copolymer or blend of propylene produced by gas phase, slurry, bulk, solution or high pressure polymerization processes using a metallocene catalyst. Preferably, the polymer is a homopolymer of propylene which has a lower melting point than polypropylene produced from conventional catalysts having similar modulus and heat deflection temperature. The polymers may be produced in fluidized or stirred bed gas phase reactors, slurry or bulk reactors of tank or loop type or any other process practiced for the polymerization of propylene. Preferably, a supported catalyst system (metallocene plus some activator component) is employed in a slurry or gas phase reactor to produce the propylene polymer.

Copolymers include propylene and at least one comonomer (or alpha olefin), wherein the comonomer has between 2 and about 20 carbon atoms. The polymers are prepared by conventional means using a metallocene catalyst. Exemplary comonomers include ethylene, butene-1, hexene-1, and 4-methyl-1-pentene. Propylene copolymers employed preferably have a comonomer content in the range of about 0.5 to about 10 weight percent. Other polymer mixtures or blends having 3 or more polymers may be employed. Exemplary blends include polypropylene homopolymer with a polyethylene, butene-1 copolymer, and an ethylene-propylene-elastomer.

Other ingredients can also be included in the polymer compositions. These can be selected from additives commonly employed with plastics, such as fillers and/or reinforcements, strengthening fibers, plasticizers, colorants, dyes, flame retardants, antioxidants, pigments, mold release agents, drip retardants and the like, in conventional amounts. Effective amounts are selected normally ranging from about 0.1 to about 100 parts per hundred by weight of the polymer.

The polypropylene resins suitable for use in the present invention, and which have been found to impart the unexpected and superior properties are those which have a modulus and HDT value comparable to conventional polypropylene, but which can be processed (as evidenced by their HDT value) at lower temperatures. These polymers generally have narrow molecular weight distribution (MWD=Mw/Mn=about 1–5, preferably 1–3, most preferably about 1–2.5). They also generally have narrow composition distribution and tacticity distribution. The copolymers will generally exhibit melting points in the range of from about 100° C. to about 145° C., more preferably in the range of about 110° C. to about 135° C., and most preferably in the range of from about 120° C. to about 135° C. Homopolymers typically exhibit melting points about 140° C. to about 160° C. Films prepared in accordance with the present invention will typically exhibit low n-hexane extractables, generally less than 10 wt % and preferably less than about 4 wt %, and are therefore desirable for products used in food and medical applications.

Useful melt flow rates (MFR), as measured by ASTM D-1238, of the polymers of the present invention are in the range of from about 0.1 to about 5000. In a preferred embodiment, the melt flow rates range from about 0.5 to about 200. Preferred MFR ranges for film and molding applications are from about 1 to about 10, with most preferred being from about 1 to about 5. Oriented fibers produced by fibrillation or slitting of oriented film preferably have MFR ranges of about 1 to about 10, and most preferably a range of about 1 to about 5. Fibers produced by conventional spinning processes preferably have MFR of about 10 to about 200, most preferably from about 30 to about 125.

Films and Sheets

Films may be produced by techniques known to those of skill in the art. For example, blown films produced with an annular die and air cooling, or cast films using a slot die and a chill roll for cooling are acceptable techniques. Films are generally in the range of about 0.2 to about 10 mils (5 to 254 microns), however, total thickness may vary based upon the desired application. Sheets may be prepared by conventional techniques such as extruding a substantially flat profile from a die. Sheets will generally have a thickness of from about 10 to about 75 mils (254–1905 microns), although they may be substantially thicker.

Films or sheets produced within the scope of the present invention, may be oriented at lower temperatures than currently known with conventional polypropylene. Oriented films may be achieved by either post extruder manipulation of the blown film through heating and orientation, or by post extruder tentering techniques. Depending on the extent of stretching desired, either a film or a sheet may be the precursor for the oriented film products described herein.

As an orienting film example, at the present time, conventional polypropylene having an HDT value of about 95° C., and a melting point of about 160° C. is generally oriented at temperatures of about or greater than 135° C. in the machine direction (MD), and 155° C. in the transverse direction (TD). Use of the metallocene produced resins in accordance with this invention having substantially similar service temperature and modulus allows orientation to occur at about 125° C. and 140° C. for the MD and TD respectively.

The oriented films of the present invention may be in either single-or multi-layer (composite) form. Composites would include at least a first skin layer and at least one other layer. They may be formed by (1) coextrusion followed by orientation, (2) orientation of a film followed by lamination, or (3) orientation of a film followed by extrusion coating. Lower orientation temperature has advantages in coextruded films wherein the skin layer is produced from a polymer which melts at a lower temperature than the metallocene polypropylene comprising the other layer. First, the lower melting metallocene homopolymer layer allows one to use very low heat-seal-temperature skin resin without the cavity sticking problem often encountered on MD orientation of films. Further, loss of optical properties in films of this type is attributable to the melting of the very low melting seal layer resin at the processing temperature. In the present invention, the processing temperature is significantly lower, thus minimizing seal layer melting and preserving the good optics of the film.

Oriented films or products therefrom produced from metallocene catalysts are expected to possess moisture (or water) vapor transmission rate (MVTR) properties similar to products formed from resins of conventional catalysts. Moisture vapor transmission rates are indicators of the film's ability to serve as a barrier for water or moisture. With the current processes for forming films from conventional resins, the MVTR will deteriorate as the melting point of the resin is decreased. With the present invention, the lower melting point of the resin, and reduced processing temperature is achieved without compromising the moisture vapor barrier properties of the final film.

Fibers

Fibers may be formed employing molten polymer in conventional methods such as traditional melt-spinning, oriented sheet slitting, and oriented film fibrillation. The fibers may be subsequently employed in woven or non-woven fabrics. Passing the fibers or precursor film over sequential heated rolls operating at different speeds effects the needed orientation. With the process of the present invention, these rolls can be operated at substantially lower temperatures than current commercial practice.

Mold Articles

Molded articles may be fabricated by conventional techniques such as, injection-molding, injection-blow molding, extrusion-blow molding, rotational molding, or foam molding. Molded parts are found in many thicknesses, generally about 500 microns (20 mils) or greater. It is important that the resin be heated considerably above the melting point to randomize the molecules. Resins of the present invention allow lower temperatures for this heating process than conventional resins.

Figure 1:
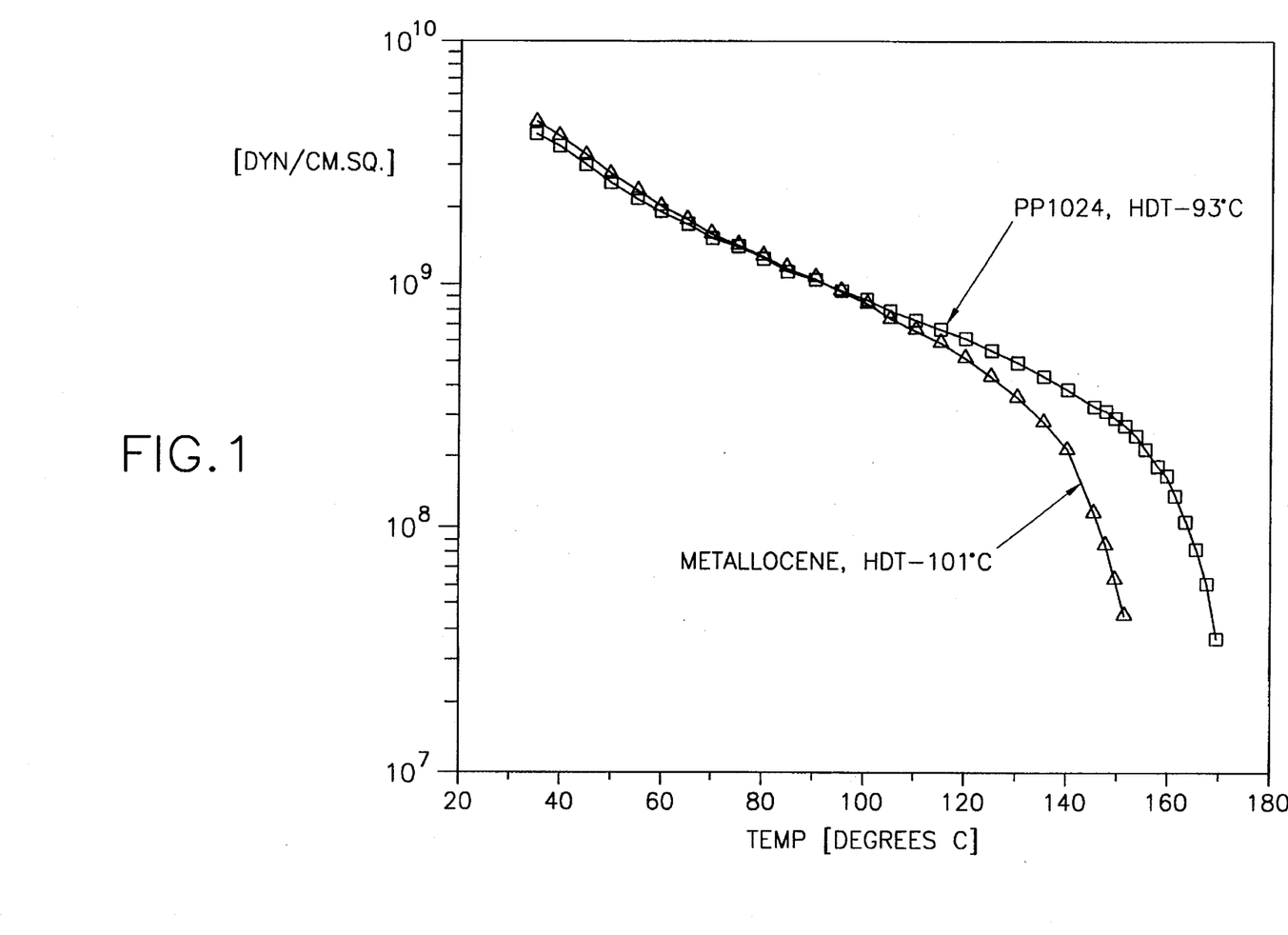
FIG. 1 is a plot of the elastic modulus in shear versus temperature for metallocene isotactic polypropylene and conventional polypropylene.

Heat Deflection Test, Dynamic Mechanical Test, and FIG. 1

As discussed previously, heat deflection temperature is an indication of the resistance to deformation of a material under stress at an elevated temperature. The temperature at which a material deforms to a prescribed extent is the heat deflection temperature (or heat deformation temperature) and is important to manufacturers for determining processing parameters of the resin and service temperature of the resultant article.

Dynamic mechanical tests measure the response of a plastic material to periodic or varying deformation. Generally, the applied deformation varies sinusoidally with time, and the resultant force required to deform the sample likewise is sinusoidal. Dynamic testing allows one to readily measure modulus of elasticity and damping or viscous properties of a polymer as a function of temperature and time.

FIG. 1 is a dynamic mechanical plot of the elastic modulus in shear versus temperature for conventional and metallocene isotactic homopolypropylene. Generally, one of skill in the art might expect that even though the material has a high room temperature modulus, a low melting metallocene polypropylene would have a low HDT value. Conversely, a high melting point material could be expected to have a high HDT value. FIG. 1 dispels this notion.

The metallocene homopolypropylene of FIG. 1 has a melting point of about 145° C. while the conventional homopolypropylene has a melting point of about 162° C. In line with earlier reports, the modulus at 30° C. is somewhat higher for the metallocene polypropylene. Unexpectedly, the moduli at 100° C. (typical heat deformation temperature for conventional polypropylene) are seen to be approximately the same for the two polymers. At 130° C. the two polymers have different moduli. Further the metallocene resin actually had a higher HDT value than the conventional polymer. The traditional or conventional view of this result leads one to expect higher modulus and service temperature polypropylene resins as metallocene catalyst technology matures and melting points approach the 160° C. level.

For estimating processing orientation temperature of polymers, the data of FIG. 1 are useful. We can determine from FIG. 1 that a modulus of approximately $2\times10^8$ dyn/cm$^2$ is required for efficient stretching. The metallocene polypropylene reached this needed modulus level at about 135° C. while the conventional polypropylene reached this modulus level at about 150° C. The present invention takes advantage of these attributes of the metallocene resin to define a process operable at lower temperatures than currently possible with today's conventional resins, but which yield a product substantially equivalent to today's best film products.

Producing Oriented Structures

In accordance with the preferred embodiments of this invention, there is provided a process for forming an oriented structure comprising the steps of:

(a) forming a structure from a polypropylene resin, said polypropylene resin produced from at least one metallocene catalyst; and, (b) orienting the structure by applying stress at a temperature in the range of from about 20° C. to about 35° C. above the HDT of the polypropylene. A more preferred orientation temperature range is from about 20° C. to about 30° C., and most preferred range is from about 25° C. to about 30° C. above the HDT of the polypropylene. Alternatively, one may consider upper orienting temperature ranges to be about 35° C., 30° C., and 25° C. above the HDT value of the polypropylene and lower orienting temperatures to be about 20° C. and 25° C. above the HDT value of the polypropylene.

An alternate embodiment relates to a process for forming an oriented composite film wherein a film or sheet comprising (a) at least one first layer of a polypropylene polymer produced from a metallocene catalyst, and, (b) at least one other layer of some polymer having a lower melting point than the first layer of (a) is stretched, or oriented, by applying stress at a temperature in the range of from about 20° C. to about 35° C. above the HDT value of the metallocene catalyzed polypropylene. Preferably the metallocene polypropylene in a composite film is a homopolymer, but this is not necessary, and depends on the desired applications of the final film.

A further embodiment of the present invention relates to the maximum temperature to be applied during orientation wherein the maximum temperature does not exceed about 35° C. above the HDT of the polypropylene.

EXAMPLES

The following illustrative, but non-limiting examples will further illustrate the invention. They are not to be construed to limit the claims in any manner.

Synthesis of the metallocene employed for production of the isotactic polypropylene homopolymer of the example is a multistep process as outlined below.

Synthesis of
rac-dimethylsilandiylbis(2-methyl-4,5-benzoindenyl)-
zirconium dichloride Diethyl methyl (2-naphthylmethyl) malonate (1)

5.15 g (224 mmol) of sodium were dissolved in 150 ml of absolute ethanol, while heating, and 37.3 ml (217 mmol) of diethyl methyimalonate were added at room temperature. A solution of 50 g (217 mmol) of 2-bromomethylnaphthalene (96% pure) in 270 ml of ethanol was slowly added dropwise at 0° C., and the mixture was heated under reflux for a further 4 to 5 hours. It was poured onto icewater and extracted with ethyl acetate. The combined organic phases were dried with sodium sulfate and evaporated. After drying under an oil pump vacuum, the oily residue was stirred with hexane at 0° C., whereupon 55 g (81%) of the compound 1 crystallized.

Synthesis of 2-Methyl-3-naphthylpropionic acid (2)

A solution of 23.7 g (422 mmol) of potassium hydroxide in 50 ml of water was added to 33.2 g (105 mmol) of the compound 1 in 70 ml of ethanol, and the mixture was heated under reflux for 4 hours. After the solvent had been stripped off, the solid residue was taken up in ethyl acetate, water was added and the pH was brought to 1 with hydrochloric acid. The aqueous phase was extracted several times with ethyl acetate. After drying over magnesium sulfate, the combined organic phases were evaporated completely. The residue was stirred with hexane for crystallization. For decarboxylation, the beige-colored solid was heated at 175° C. until the evolution of gas had ended. 21 g (94%) of the product 2 were obtained as a beige-colored solid.

Synthesis of 2-Methyl-6,7-benzoindon-1-one (3)

22 ml of thionyl chloride were added to 21 g (98 mmol) of the compound 2, with exclusion of moisture, and the mixture was heated under reflux for 30 minutes. Excess thionyl chloride was then distilled off. The residue was briefly freed from volatile compounds under an oil pump vacuum and then dissolved in 25 ml of methylene chloride, under Ar as an insert gas. The solution was slowly added dropwise to a suspension of 26 g ( 196 mmol) of aluminum trichloride in 60 ml of methylene chloride and the mixture was heated under reflux for a further 30 minutes. It was poured onto ice and extracted with methylene chloride. The combined organic phases were dried with sodium sulfate and evaporated. The dark oily residue was chromatographed on 600 g of silica gel 60. 8.6 g (45%) of the compound 3 were able to be eluted (yellowish solid) with a mobile phase mixture of hexane/ethyl acetate (9:3).

Synthesis of 2-Methyl-4, 5 -benzoindene (4)

2.2 g (59.5 mmol) of sodium borohydride were added in portions to a solution of 7.8 g (39.7 mmol) of the indanone, compound 3 in 400 ml of a tetrahydrofuran/methanol mixture (2:1) at room temperature, and the mixture was stirred for 14 hours. The solution was poured onto HCL-acid ice and extracted with ether. The combined organic phases were washed several times with water and dried with sodium sulfate. The orange-colored oil which remained after the solvent had been stripped off was dissolved in 240 ml of toluene, and the solution was heated at 80° C. with 570 mg (3.15 mmol) of p-toluene-sulfonic acid for 15 minutes. It was washed several times with water at room temperature, dried with sodium sulfate and evaporated. The residue was chromatographed on 300 g of silica gel 60. 4.7 g (65%) of the indene 4 were able to be eluted (colorless oil) with a mobile phase mixture of hexane/diisopropyl ether (20:1). $^1$H-NMR spectrum (360 MHz, CDCL$_3$): 8.02 (1,d), 7.84 (1, m), 7.59 (1, d), 7.52 (1,d), 7.38–7.48 (2,m), 7.06 (1,m), 3.42 (2,s), 2.25 (3,d).

10.2 ml (25.5 mmol) of a 2.5 M butyllithium solution in hexane were added to a solution of 4.6 g (25.5 mmol) of the compound 4 in 50 ml of tetrahydrofuran at room temperature, and the mixture was heated under reflux for 1 hour. The red solution was then added dropwise to a solution of 155 g (12 mmol) of dimethyldichlorosilane in 10 ml of tetrahydrofuran at room temperature, and the mixture was heated under reflux for 5 to 6 hours. The reaction solution was poured onto ice-water and extracted several times with ether. The combined organic phases were dried with sodium sulfate and evaporated, and the residue was dried under an oil pump vacuum. It was chromatographed on 300 g of silica gel 60. 500 mg of unreacted starting compound 4 were initially able to be eluted with a mobile phase mixture of hexane/3% ethyl acetate. The ligand system, compound 5, then followed with the same mobile phase. After the solvent had been stripped off, this ligand system was crystallized (isomers) from hexane. The yield was 1.7 g (34%, or 44% with respect to the indene, compound 4 reacted).

Synthesis of rac - Dimethylsilandiylbis (2-methyl-4,5-benzo-indenyl) zirconium dichloride (6)

4.0 ml (10.2 mmol) of a 2.5 M butyllithium solution in hexane were added to a solution of 1.7 g (4.1 mmol) of compound 5 in 20 ml of tetrahydrofuran at room temperature under Ar as an inert gas, and the mixture was stirred at room temperature for 14 hours. The residue which remained after the solvent had been stripped off was dried using an oil pump vacuum and washed with hexane. The pale brown powder obtained was dried using an oil pump vacuum at 40° to 50° C. for several hours and added to a suspension of 1.0 g (4.0 mmol) of zirconium tetrachloride in 25 ml of methylene chloride at −78° C. After the mixture had been warmed to room temperature, the solvent was stripped off and the residue was extracted with 20 ml of toluene in order to remove the meso form of the metallocene, compound 6. The residue of the toluene extract was then extracted with 40 ml of methylene chloride. The solution was concentrated to a small volume and left to crystallize at −35° C. A total of 970 mg (42%) of the zirconocene, compound 6 were isolated in several fractions as the pure racemate. $^1$H-NMR spectrum of the racemate (300 MHz, CDCL$_3$): 7.96 (2,m), 7.78 (2,m), 7.60 (2,d), 7.48–7.56 (4,m), 7.36 (2,d), 7.27 (2,s,b-Ind-H), 2.37 (6,s, Ind-CH$_3$), 1.36 (6,s, Si-CH$_3$). Mass spectrum: 574 M$^+$, correct disintegration, correct isotope pattern.

Supporting Catalyst Compound (6)

To an eight-liter vessel equipped with a cooling jacket and an efficient overhead stirrer was added methylalumoxane (30 wt % in toluene, 925 ml). With stirring, a suspension of compound 6 (5.0 g) in toluene (700 ml) was added under N$_2$ through a double-ended needle. After stirring for 10 minutes, dehydrated silica (Davison 948, dried at 800° C., 200 g) was added to the solution over 20 minutes. The slurry was stirred for 10 minutes and then, while a vacuum was applied from the top of the vessel, a slight flow of N$_2$ was added through the bottom . The mixture was heated to 70° C. as the solvent was evaporated over a 9 hour period. The dry solid was cooled to ambient temperature overnight. Isopentane (5 liters) was added to slurry the solids and the mixture cooled to 0° C. Ethylene was added to the stirred mixture by a dip tube at a rate of 0.03–0.06 SCF/minute until a total of 491 liters of ethylene had been added. Agitation was stopped and the solids allowed to settle. The liquid was decanted from the solids, which were washed twice, each with 1.5 liters of isopentane. Tile wet solids were transferred to a drybox under N$_2$ and filtered through a #14 mesh sieve. The fine particles were filtered off, washed with pentane (4 liters) and dried in vacuo. Yield: 326 g.

Polymerization with Supported Compound 6

Large Scale Production of Polymer

The homopolymer referred in FIG. 1 was produced in a continuous, single reactor, bulk liquid phase polymerization process. The reactor was equipped with an agitator, and jacket for removing the heat of reaction. The reactor temperature was set at 65° C., and supported prepolymerized catalyst (compound 6) was fed to the reactor at a rate of 1.3 g catalyst/hour. Propylene was fed to the reactor at a rate of 60 kg propylene/hour. A continuous flow of hydrogen (0.75 g hydrogen/hour) was used to control the molecular weight of the product. The average residence time of the catalyst in the reactor was 4.0 hours and polymer was produced at a rate of 9.1 kg polymer/hour. The product had a 7 MFR (230° C./2.16 kg per ASTM D1238), and a peak melting point of about 145° C.

The homopolymer resin obtained above was mixed with 0.05 wt % Irganox 1076 for oxidative stability and pelletized on a one inch diameter lab extruder at conditions typical for polypropylene. The samples were prepared for testing in accordance with ASTM D4101. The injection molding was done on a Van Dorn 75 ton molding press. Standard polypropylene conditions were used in the molding operation.

COMPARATIVE EXAMPLE

Conventional polypropylene, PP-1024, obtained from Exxon Chemical Company, Baytown, Tex., was chosen as a comparison standard to the above described metallocene prepared polypropylene sample. PP-1024 had a 12 MFR and a MP of about 162° C. The sample was prepared for testing in accordance with ASTM D4101. The injection molding was done on a Van Dorn 75 ton molding press. Standard polypropylene conditions were used in the molding operation Sample Preparation for Heat Distortion and Dynamic Mechanical Testing Samples for both heat distortion and dynamic mechanical testing are prepared in the same manner. For polypropylene, the samples are melted and injection molded according to ASTM D4101. Sample dimensions for the heat distortion test are 6"×0.5"×0.125", for dynamic mechanical testing, sample dimensions are 2"×0.5"×0.125". A common practice is to cut the heat distortion sample to a 2" length for dynamic testing.

Dynamic Mechanical Testing/Heat Distortion Test

The samples described above were subjected to a Heat Distortion Test (HDT) conducted in accordance with ASTM D648 at 66 psi (455 kPa) specific load. The heat distortion temperature for the metallocene polypropylene sample was found to be about 101° C.; an HDT value of about 93° C. was found for PP- 1024.

Dynamic mechanical testing was conducted by oscillating a solid rectangular beam, fixed at one end, through an arbitrary angle of deflection. The force required to deflect the sample is measured. The force and angle of deflection are used to calculate stress and strain respectively. The ratio of the stress to strain yields a modulus. Varying the temperature during the test yields information about the behavior of the material as a function of temperature. Results of the dynamical mechanical testing for the metallocene polypropylene and the comparative sample PP 1024 are illustrated in FIG. 1. Representative illustrative data are also in the table below:

TABLE

Illustrative Data of Moduli versus Temperature for Met PP* and PP 1024.

| Modulus (dyn/cm$^2$) | Temperature (°C.) Metallocene PP | Temperature (°C.) PP 1024 |
| --- | --- | --- |
| $2 \times 10^7$ | 150 | 170 |
| $1 \times 10^8$ | 147 | 165 |
| $2 \times 10^8$ | 135 | 150 |
| $4 \times 10^8$ | 125 | 135 |
| $8 \times 10^8$ | 100 | 100 |

The data found in the table are approximate values.
* = Metallocene Polypropylene Those skilled in the art will appreciate that modifications and variations of the present invention are possible in light of the above teachings without departing from the scope or spirit of the present invention. It is, therefore, to be understood that changes may be made in the particular embodiments of the invention described which are within the full intended scope of the appended claims.

We claim:

1. A process for forming an oriented structure comprising the steps of:

(a) forming a structure from a polypropylene resin, said polypropylene resin produced from a metallocene catalyst; and, (b) orienting the structure by applying stress at a temperature in the range of from about 20° C. to about 35° C. above the HDT value of the polypropylene.

2. The process of claim 1 wherein the temperature range is from about 20° C. to about 30° C. above the HDT of the polypropylene.

3. The process of claim 2 wherein the temperature range is from about 25° C. to about 30° C. above the HDT of the polypropylene.

4. The process of claim 1 wherein the polypropylene is a homopolymer.

5. The process of claim 1 wherein the polypropylene is a copolymer of propylene and at least one comonomer having between 2 and about 20 carbon atoms.

6. The process of claim 5 wherein the propylene copolymer has a comonomer content in the range of about 0.5 to about 10 weight percent.

7. The process of claim 5 wherein the copolymer is selected from the group consisting of propylene/ethylene, propylene/butene, and propylene/hexene.

8. The process of claim 1 wherein the polypropylene is a blend of polypropylene and another polymer.

9. The process of claim 1 wherein the metallocene comprises a silicon-bridged bis(substituted indenyl) Group 4, 5, or 6 transition metal dihalide.

10. The process of claim 9 wherein the metallocene is selected from the group consisting of dimethylsilylbis(2-methylindenyl) zirconium dichloride, dimethylsilylbis(2-methyl-4,5-benzindenyl) zirconium dichloride, dimethylsilylbis(2-methyl-4,6-diisopropylindenyl) zirconium dichloride, and dimethylsilylbis(2-methyl-4-phenylindenyl) zirconium dichloride.

11. The process of claim 10 wherein the metallocene is dimethylsilylbis(2-methyl-4,5-benzindenyl) zirconium dichloride.

12. The process of claim 9 wherein the metallocene is supported on an inert carrier.

13. A process for forming an oriented film comprising the steps of:

(a) forming a film or sheet comprising at least one first layer of a polypropylene resin, said polypropylene resin produced from a metallocene catalyst; and, (b) stretching the film or sheet by applying stress at a temperature in the range of from about 20° C. to about 35° C. above the HDT value of the polypropylene resin.

14. The process of claim 13 wherein the film or sheet prior to stretching further comprises at least one other layer of some polymer having a lower melting point than the first polypropylene layer.

15. A process for forming an oriented structure comprising the steps of
   (a) forming a structure from a polypropylene resin, said polypropylene produced from a metallocene catalyst; and,
   (b) orienting the structure by applying stress at a temperature not to exceed about 35° C. above the HDT value of the polypropylene.

16. The process of claim 1 wherein the oriented structure is a fiber.

17. The process of claim 1 wherein the oriented structure is a molded article.

* * * * *

REEXAMINATION CERTIFICATE (3174th)

United States Patent [19]

McAlpin et al.

[11] B1 5,468,440

[45] Certificate Issued Apr. 8, 1997

[54] PROCESS OF MAKING ORIENTED FILM OR STRUCTURE

[75] Inventors: James J. McAlpin, Houston; Jeffrey W. C. Kuo, Seabrook; Donald C. Hylton, Houston, all of Tex.

[73] Assignee: Exxon Chemical Patents Inc., Wilmington, Del.

Reexamination Request:
No. 90/004,186, Mar. 19, 1996

Reexamination Certificate for:
Patent No.: 5,468,440
Issued: Nov. 21, 1995
Appl. No.: 239,150
Filed: May 6, 1994

[51] Int. Cl.$^6$ ............... B29C 55/02; B29C 55/22
[52] U.S. Cl. ............... 264/291; 156/229; 156/244.11; 156/244.14; 264/209.3; 264/210.1; 264/210.8; 264/216; 264/288.4; 264/290.2; 264/290.5; 264/564; 427/172; 427/173

[58] Field of Search ............... 264/171.23, 173.19, 264/209.3, 209.5, 210.1, 210.8, 216, 288.4, 290.2, 290.5, 291, 564; 156/229, 244.11, 244.14; 427/172, 173

[56] References Cited

FOREIGN PATENT DOCUMENTS

| | | |
|---|---|---|
| 451743 | 10/1991 | European Pat. Off. . |
| 519237 | 12/1992 | European Pat. Off. . |
| 518092 | 12/1992 | European Pat. Off. . |
| 538749 | 4/1993 | European Pat. Off. . |

*Primary Examiner*—Leo B. Tentoni

[57] ABSTRACT

Applications of isotactic polypropylene resin compositions produced from metallocene catalyst wherein the resins yield articles with comparable shear modulus and heat distortion temperature values to those of conventional polypopylene, but in which the fabrication of the article is achieved at temperatures much lower than possible for conventional polypropylene.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 13–15 are cancelled.

Claim 1 is determined to be patentable as amended.

Claims 2–12, 16 and 17, dependent on an amended claim, are determined to be patentable.

1. A process for forming an oriented structure comprising the steps of:

(a) forming a structure [from a] *consisting essentially of an isotactic* polypropylene resin, said polypropylene resin produced from a metallocene catalyst; and (b) orienting the structure by applying stress at a temperature [in the range of from about 20° C. to] *not to exceed* about 35° C. above the HDT value of the polypropylene.

* * * * *